United States Patent Office 3,497,548
Patented Feb. 24, 1970

3,497,548
METHOD FOR PRODUCING CHLORO-CYANOACETYLENE
Katsura Morita, Ikeda, and Naoto Hashimoto, Suita, Osaka, Japan, assignors to Takeda Chemical Industries, Ltd., Higashi-ku, Osaka, Japan
No Drawing. Filed May 31, 1967, Ser. No. 642,336
Claims priority, application Japan, June 9, 1966, 41/37,496
Int. Cl. C07c *121/00*
U.S. Cl. 260—465.7  4 Claims

ABSTRACT OF THE DISCLOSURE

Chlorocyanoacetylene is produced in high yields by pyrolysis of nitriles having three carbon atoms and two or three chlorine atoms.

---

This invention relates to a method for the production of chlorocyanoacetylene, and, more concretely, to a method for the production of chlorocyanoacetylene, which comprises subjecting a nitrile, having three carbon atoms and two or three chlorine atoms, to a gas phase reaction under heating.

Chlorocyanoacetylene, Cl—C≡C—CN, is useful—owing to its high reactivity—as an intermediate in the preparation of various chemical compounds, for example, of nitrogen containing heterocyclic compounds including purine bases, yridine bases, etc.

Hitherto, for the production of the chlorocyanoacetylene, there has been known only a method comprising reacting lithium cyanoacetylide with chlorine. However, this method can provide the objective compound only in a very low yield, and therefore is not satisfactory from an industrial point of view.

Thus, it is a principal object of this invention to provide an industrially feasible method for producing chlorocyanoacetylene.

According to the method of the present invention, the objective chlorocyanoacetylene can easily be produced in a high yield and, therefore, the process is advantageously used for the production of the said compound on a commercial scale. The nitrile, having three carbon atoms and two or three chlorine atoms, of the present method is represented by the following general formula

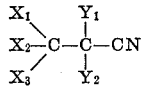

(I)

wherein each of three of $X_1$, $X_2$, $X_3$, $Y_1$, $Y_2$ stands for Cl and each of the other two stands for H, or $X_1$ and $Y_1$ together represent a bond which, with the carbon-to-carbon bond shown in Formula I, forms a double bond between the α and β carbon atoms, and each of two of $X_2$, $X_3$, $Y_2$ stands for Cl while the remaining one stands for H.

These compounds include, for example, α,α,β-trichloropropionitrile; α,β-dichloroacrylonitrile; β,β-dichloroacrylonitrile; β,β,β-trichloropropionitrile; and α,β,β-trichloropropionitrile.

The present method is carried out by subjecting one of the aforementioned nitriles or any combination of the nitriles to a vapor phase reaction at an elevated temperature. The optimum reaction temperature varies with the reaction conditions, e.g. pressure, but in general it is in range of about 300 to about 1200° C., and preferably about 500 to about 1000° C. The reaction can be carried out at atmospheric pressure, but operation at a reduced pressure of about 10 to about 50 mm. Hg is desirable.

The starting material, the nitrile of the Formula I, is a liquid at room temperature and is easily vaporized by heating at about 150° C. or higher under atmospheric pressure. Therefore, the method of the present invention can advantageously be conducted by first heating the nitrile at its boiling point or a little higher to produce the gaseous nitrile, and then heating the thus-produced gaseous nitrile at the desired reaction temperature.

Practically, the method is carried out by introducing the gaseous nitrile into a reactor, which is made of a quartz tube and placed in a horizontal or vertical furnace kept at the desired temperature throughout the reaction. As the reactor, the tubular type is optimal, but any other type may be used as occasion demands. The reactor may contain proper catalyst, or any other additives and inert gas such as nitrogen, carbon dioxide and the like may be present in the reaction system, if desired.

The following examples show presently preferred embodiments of this invention, but are not intended to be restrictive. In the examples, the abbreviations "cm.," "mm." and "g." represent "centimeter(s)," "millimeter(s)" and "grams(s)," respectively.

EXAMPLE 1

Two tubular electric furnaces are placed in a straight line and a tubular quartz reactor is arranged to extend through center of the said furnaces. One end of the reactor is connected with a vacuum distillation column and the other is connected with water-jet pump through a series of collectors, the whole system being equipped with a vacuum regulator.

After 5 parts by weight of α,α,β-trichloropropionitrile are charged into the column, the furnace closest to the column is heated at 700° C. and the other, more remote furnace is heated at 900° C., and pressure of the whole apparatus is reduced to about 22 mm. Hg by means of the water-jet pump, while the column is heated at 150° C. under nitrogen gas stream, whereby the α,α,β-trichloropropionitrile is vaporized and is led to the reactor together with the nitrogen gas.

After continuing the procedure for half an hour, the entire content of the column will be consumed. Nitrogen gas is blown into the collectors to sublimate the resultant product. The sublimated material is recovered by leading to another collector cooled by dry ice-ethanol to yield 1.98 parts by weight of chlorocyanoacetylene. Yield: 73.1%.

EXAMPLE 2

By the use of the same apparatus as in Example 1, 5 parts by weight of β,β-dichloroacrylonitrile is subjected to a gas phase reaction in the same manner as in Example 1 except that one of the furnaces is heated at 700° C. and the other at 980° C. and that the procedure is continued for 20 minutes. Thus, 2.52 parts by weight of chlorocyanoacetylene is produced. Yield: 72%.

EXAMPLE 3

By the use of the same apparatus as in Example 1, 5 parts by weight of α,β-dichloroacrylonitrile is subjected to a gas phase reaction after the same manner as in Example 1 except that one of the furnaces is heated at 700° C. and the other at 980° C. and that the procedure is continued for 15 minutes. Thus 2.51 parts by weight of chlorocyanoacetylene is produced. Yield: 72%.

What is claimed is:
1. A method for producing chlorocyanoacetylene which comprises heating a nitrile selected from the group consisting of α,α,β-trichloropropionitrile; α,β-dichloroacrylonitrile; β,β - dichloroacrylonitrile; β,β,β - trichloro- propionitrile; and α,β,β-trichloropropionitrile to from about 300° C. to about 1200° C., whereby reaction takes place in the gaseous phase with formation of the objective cholorocyanoacetylene.

2. The method according to claim 1, wherein the nitrile is α,α,β-trichloropropionitrile.

3. The method according to claim 1, wherein the nitrile is α,β-dichloroacrylonitrile.

4. The method according to claim 1, wherein the nitrile is β,β-dichloroacrylonitrile.

References Cited

UNITED STATES PATENTS 3,070,622  12/1962  Martin _____ 260—465.7

JOSEPH P. BRUST, Primary Examiner